(12) United States Patent
Zearbaugh et al.

(10) Patent No.: US 6,186,452 B1
(45) Date of Patent: Feb. 13, 2001

(54) ROBUST TUBE STRAP CLAMP

(75) Inventors: Scott R. Zearbaugh, Milford; Mark R. Shaw, Hamilton, both of OH (US)

(73) Assignee: General Electric Company, Cincinnati, OH (US)

( * ) Notice: Under 35 U.S.C. 154(b), the term of this patent shall be extended for 7 days.

(21) Appl. No.: 09/215,860

(22) Filed: Dec. 18, 1998

(51) Int. Cl.[7] .............................. F16L 3/123; F16L 3/04
(52) U.S. Cl. ................................ 248/74.4; 248/229.24
(58) Field of Search .......................... 248/65, 68.1, 71, 248/73, 74.1, 74.2, 74.3, 74.5, 229.24, 229.1, 229.15, 229.16, 229.17, 229.25, 74.4, 62

(56) References Cited

U.S. PATENT DOCUMENTS

| | | | |
|---|---|---|---|
| 2,972,461 | * | 2/1961 | Balbach et al. ................... 248/68.1 |
| 3,042,352 | * | 7/1962 | Stamper ............................ 248/68.1 |
| 3,227,406 | * | 1/1966 | Shelton et al. ..................... 248/74.4 |
| 4,146,203 | * | 3/1979 | Williams ........................... 248/62 |
| 5,271,588 | | 12/1993 | Doyle .............................. 248/68.1 |
| 5,297,890 | * | 3/1994 | Commins ........................... 403/398 |
| 5,582,058 | * | 12/1996 | Knudson ........................... 72/379.2 |
| 6,079,674 | * | 6/2000 | Snyder ............................. 248/74.3 |

* cited by examiner

Primary Examiner—Ramon O. Ramirez
Assistant Examiner—Jon Szumny
(74) Attorney, Agent, or Firm—Andrew C. Hess; Nathan D. Herkamp

(57) ABSTRACT

A tube clamping assembly for securing tubes against movement has a bracket and a strap clamp for clamping a tube to the bracket. The strap clamp is configured to be sufficiently flexible so as to close large clamp gaps. In one embodiment, the strap clamp has a generally U-shaped portion having a pair of angled leg sections connected to a flat section. Each one of the angled leg sections forms an obtuse angle at about its midpoint so as to define an inner segment, which is connected to the flat section, and an outer segment. The inner segment of each angled leg section forms an obtuse angle with the flat section, and the outer segments are substantially perpendicular to the flat section. The U-shaped portion has a mounting flange extending from each one of the angled leg sections for bolting the strap clamp to the bracket.

17 Claims, 4 Drawing Sheets

ROBUST TUBE STRAP CLAMP

BACKGROUND OF THE INVENTION

This invention relates generally to gas turbine engines and more particularly to a clamp for securing tubes within the engine against movement, including vibratory movement.

A gas turbine engine such as that used for powering an aircraft in flight includes numerous tubes for channeling various fluids through the engine during operation. Conventional clamps are used for mounting tubes to various points on the engine casing to accurately position the tubes and prevent their movement during operation of the engine. Since the gas turbine engine includes various rotating components, the tubes are subject to vibratory excitation that must be controlled for preventing vibratory fatigue damage thereto. Therefore, it is common to use clamping assemblies for mounting tubes to other tubes to further control vibrations in the tubes.

One exemplary conventional tube-to-tube clamping assembly used in a gas turbine engine includes a bracket abutting each of two tubes to be clamped together. Each tube is clamped to the bracket by a corresponding strap clamp. The strap clamps are semi-circular pieces that fit over the tubes and are bolted to the bracket. In order for the strap clamps to securely clamp their respective tube to the bracket, the tube diameter is slightly greater than the depth of the semi-circular portion of the strap clamps. Thus, a gap exists between each strap clamp and the bracket prior to the bolts being torqued. Torquing the bolts closes the gap and clamps the tubes to the bracket, and thus to one another. However, the clamping assembly is not positively located with respect to the tubes since the bracket is not attached to the engine casing or another bracket. The clamping assembly thus must be visibly located by markings etched on the tubes. Consequently, the clamping assembly location can vary significantly on the tubes which causes a large gap variation.

An excessively large clamp gap cannot be fully closed with the bolt torque load at installation because of the general inflexibility of the conventional semi-circular strap clamp. An unclosed gap can cause relaxation of the bolt joint preload and subsequent joint failure. This condition can occur not only in tube-to-tube clamping assemblies but also in any clamp design that is not positively located or has significant stiffness due to large strap thickness.

Accordingly, there is a need for a clamping assembly that has increased strap clamp flexibility to accommodate a large variation in clamp gaps.

SUMMARY OF THE INVENTION

The above-mentioned needs are met by the present invention which provides a tube clamping assembly having a bracket and a strap clamp for clamping a tube to the bracket. The strap clamp is configured to be sufficiently flexible so as to close large clamp gaps. In one embodiment, the strap clamp has a generally U-shaped portion having a pair of angled leg sections connected to a flat section. Each one of the angled leg sections forms an obtuse angle at about its midpoint so as to define an inner segment, which is connected to the flat section, and an outer segment. The inner segment of each angled leg section forms an obtuse angle with the flat section, and the outer segments are substantially perpendicular to the flat section. The U-shaped portion has a mounting flange extending from each one of the angled leg sections for bolting the strap clamp to the bracket.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

FIG. 3 is a traverse section view of the clamping assembly of the present invention in which the strap clamp is not bolted on.

FIG. 4 is a traverse section view of the clamping assembly of the present invention in which the strap clamp is bolted on.

FIG. 6 is a traverse section view of a second embodiment of the clamping assembly of the present invention in which the strap clamp is not bolted on.

FIG. 7 is a traverse section view of a second embodiment of the clamping assembly of the present invention in which the strap clamp is bolted on.

DETAILED DESCRIPTION OF THE INVENTION

Figure 1:
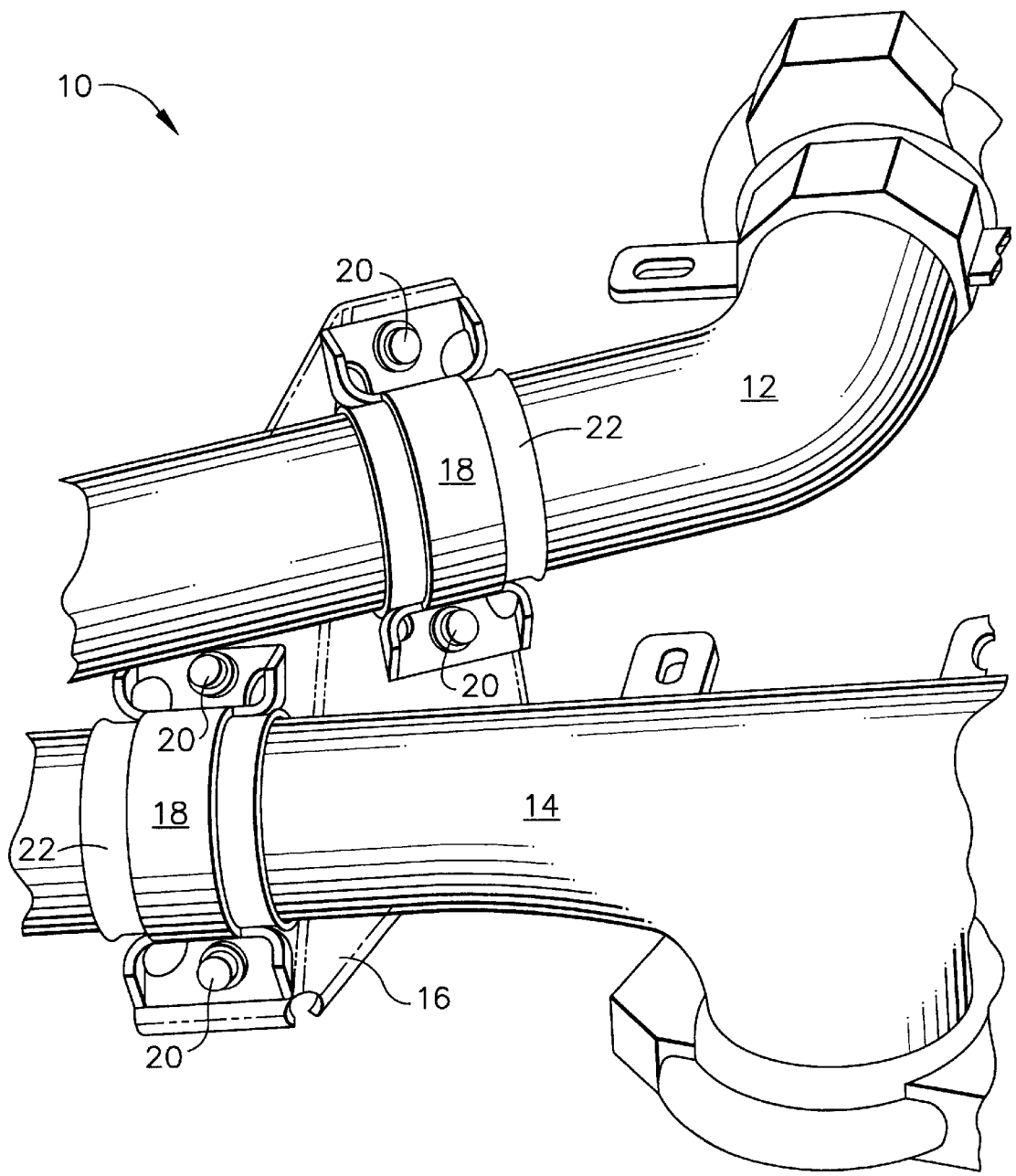
FIG. 1 is a perspective view of the clamping assembly of the present invention.
Figure 2:
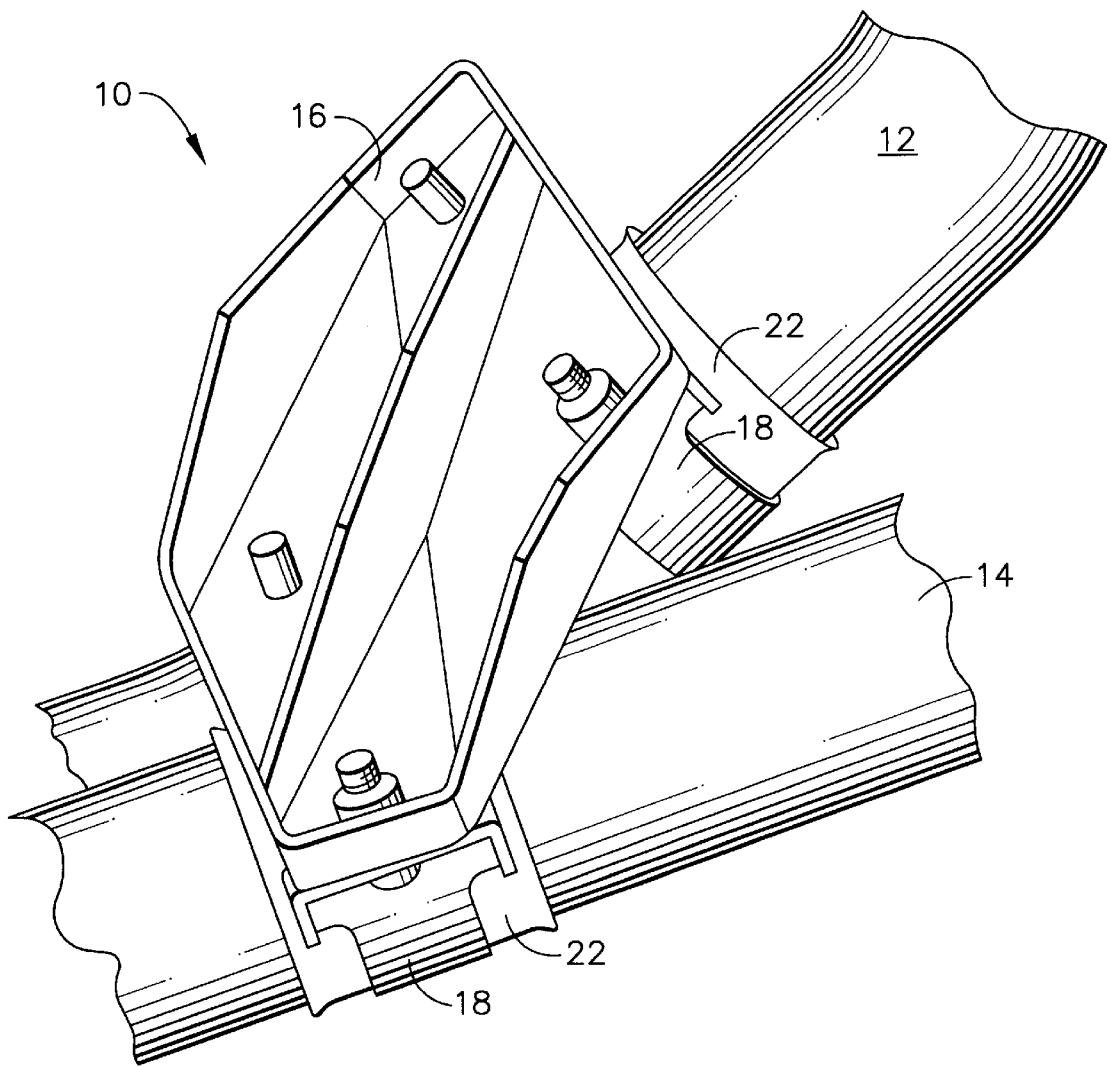
FIG. 2 is a another perspective view of the clamping assembly of the present invention.

Referring to the drawings wherein identical reference numerals denote the same elements throughout the various views, FIGS. 1 and 2 show a clamping assembly 10 for clamping two tubes 12 and 14 together. The tubes 12 and 14 are typically tubes used on a gas turbine engine to carry operating fluids such as fuel, oil and air, although the clamping assembly 10 can be used with tubes having other applications. Furthermore, although the clamping assembly 10 shown in FIGS. 1 and 2 is a tube-to-tube type clamping assembly, this is only for purposes of illustration. It should be understood from the following description that the present invention is also applicable to other types of clamping assemblies, such as those for clamping tubes to the engine casing.

The clamping assembly 10 includes a bracket 16 and a pair of strap clamps 18. The bracket 16, which as best seen in FIG. 2 has a generally trapezoid shape, is positioned against the two tubes 12 and 14, and each tube is clamped to the bracket 16 by a respective one of the strap clamps 18, which are bolted to the bracket 16 by bolts or other suitable fasteners 20. The bracket 16 and strap clamps 18 are made from any suitable metal material, such as stainless steel or nickel-based alloys like Inconel.

Since metal tube clamps can abrade or chafe the tubes contained therein due to vibratory excitation of the tubes during engine operation, a wear sleeve 22 is optionally disposed between each tube 12 and 14 and its respective strap clamp 18. The wear sleeve 22 is made of a suitable material that will prevent undesired wear of the tubes 12 and 14 during engine operation.

Figure 5:
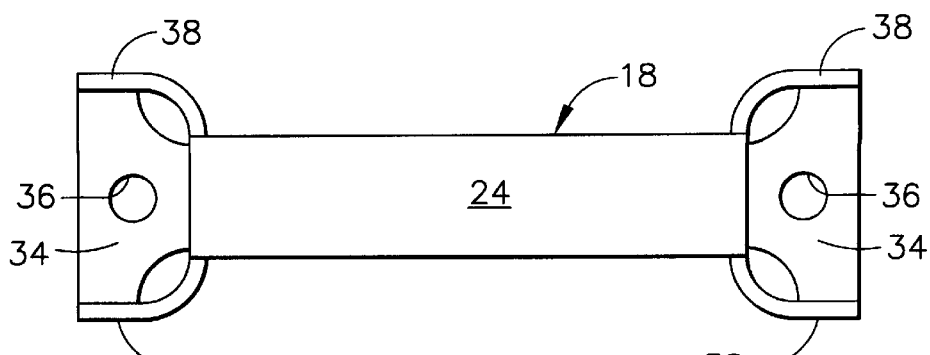
FIG. 5 is a top view of the strap clamp of the clamping assembly of the present invention.
Figure 3:
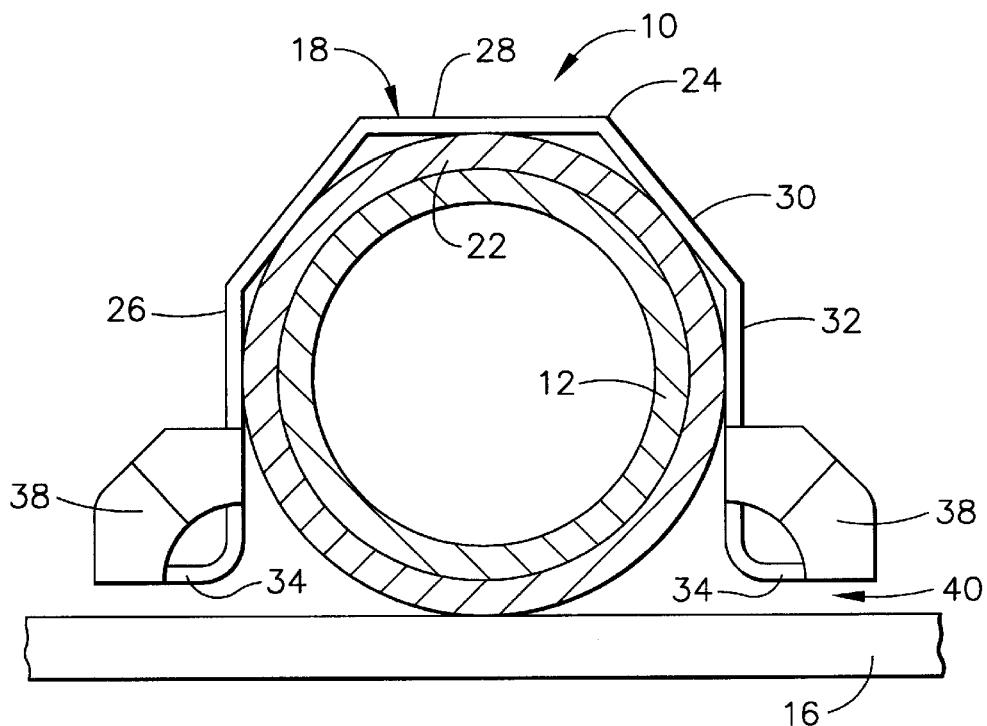
Figure 4:
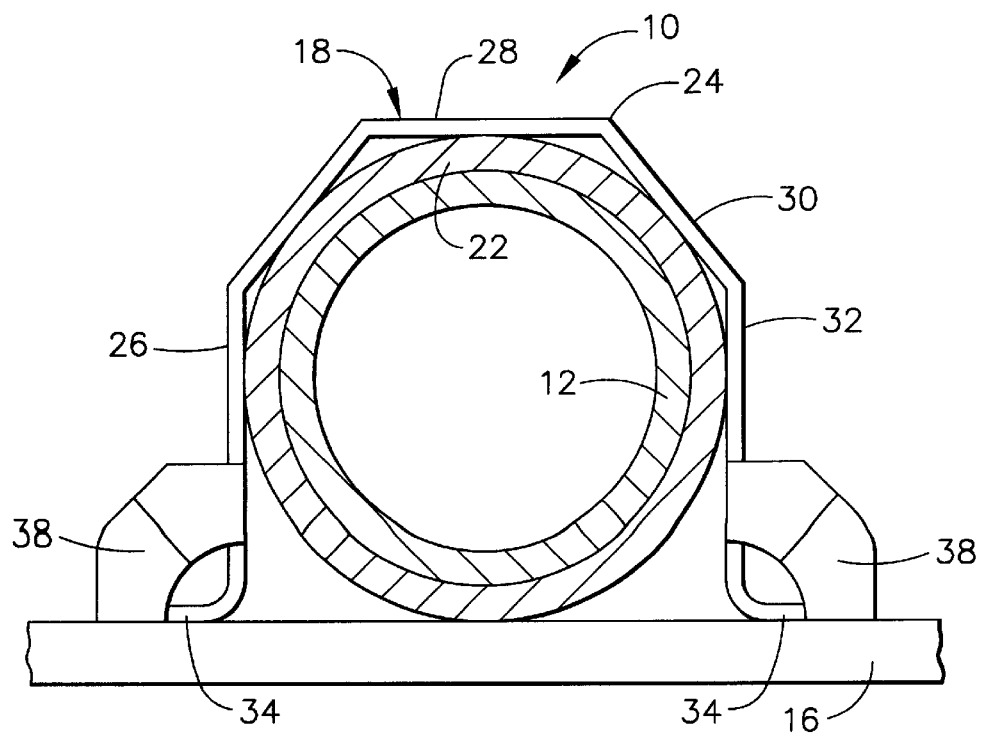

Referring to FIGS. 3–5, one of the strap clamps 18 is shown in more detail. The strap clamp 18 is a thin metal piece having a generally U-shaped portion 24 that fits over the tube 12 and wear sleeve 22. The U-shaped portion 24 has a pair of angled leg sections 26 connected to a flat section 28. Each of the leg sections 26 is angled at about its midpoint so as to form an obtuse angle and define inner and outer segments 30 and 32. The inner segment 30 of each angled leg section 26 is joined to a respective end of the flat section 28 at an obtuse angle so that the outer segments 32 are substantially perpendicular to the flat section 28. A mounting flange 34 extends perpendicularly outward from the distal end of each outer segment 32. As best shown in FIG. 5, a bolt hole 36 is formed in each mounting flange 34 for receiving the bolts 20 to secure the mounting flanges 34 against the bracket 16. Side supports 38 extend from each side of each mounting flange 34 to the adjacent leg section 26 to reinforce the mounting flanges 34. Preferably, the strap clamp 18 is made from a single stamped or machined piece of material which is bent into the desired shape.

As best illustrated in FIGS. 3 and 4, the unique configuration of the strap clamp 18 provides it with the necessary flexibility to close large clamp gaps while maintaining sufficient thickness to provide good fatigue capability. As shown in FIG. 3, in which the strap clamp 18 is not bolted to the bracket 16, a gap 40 exists between the mounting flanges 34 and the bracket 16 because the diameter of the wear sleeve 22 surrounding the tube 12 is slightly greater than the depth of the U-shaped portion 24 when it is in an unloaded state. As seen in FIG. 3, the U-shaped portion 24 contacts the wear sleeve 22 (or the tube 12 in the event a wear sleeve is not used) at three points: one on both of the inner leg segments 30 and one at the midpoint of the flat section 28. Thus, the points where the inner segment 30 of each angled leg section 26 is joined to a respective end of the flat section 28 are spaced from the outer surface of the wear sleeve 22. This configuration of the strap clamp 18 gives it sufficient flexibility to allow even unusually large clamp gaps to be closed when the strap clamp is bolted to the bracket 16. Thus, as shown in FIG. 4, in which the strap clamp 18 is bolted to the bracket 16, the mounting flanges 34 are flush with the bracket 16.

Figure 6:
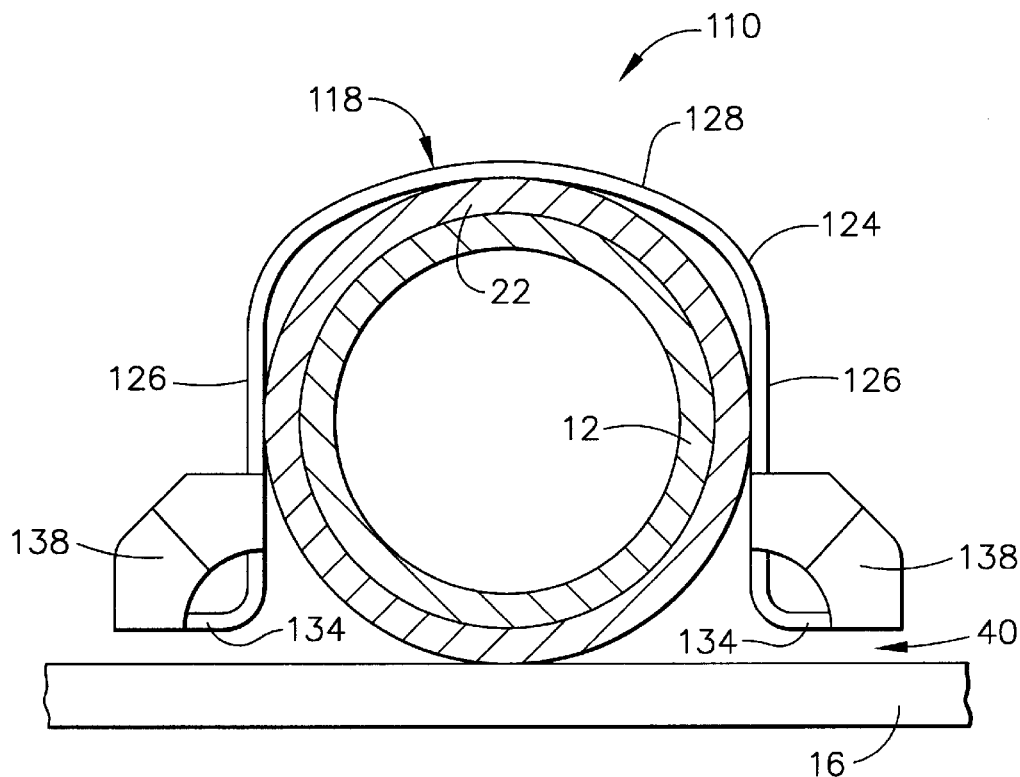
Figure 7:
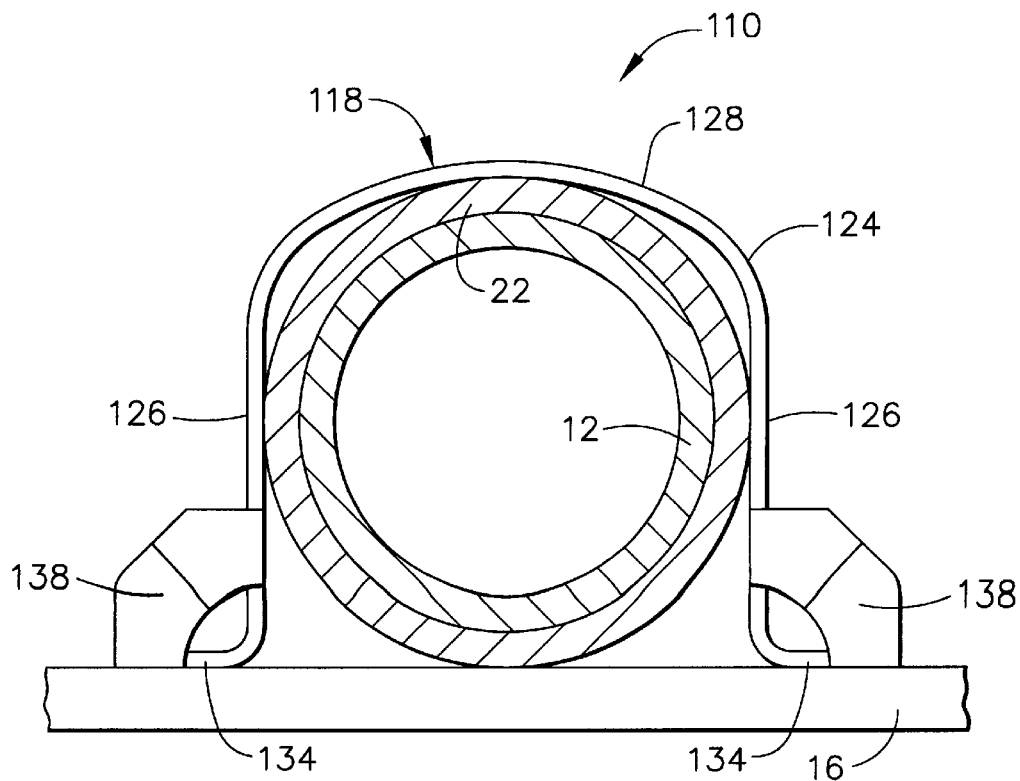

Turning to FIGS. 6 and 7, a clamping assembly 110 in accordance with a second embodiment of the present invention is shown. The clamping assembly 110 differs from the clamping assembly of the first embodiment in that it utilizes a differently configured strap clamp 118. The strap clamp 118 has a generally U-shaped portion 124 that fits over the tube 12 and wear sleeve 22. The U-shaped portion 124 has a pair of straight leg sections 126 connected to a semi-oval section 128. The semi-oval section 128 resembles half of an oval cut lengthwise so as to define a curve having a radius of curvature that is greater at its center than at its ends. A mounting flange 134 extends perpendicularly outward from the distal end of each straight leg section 126. Side supports 138 extend from each side of each mounting flange 134 to the adjacent leg section 126 to reinforce the mounting flanges 134.

Similarly to that of the first embodiment, the unique configuration of the strap clamp 118 provides it with the necessary flexibility to close large clamp gaps while maintaining sufficient thickness to provide good fatigue capability. As shown in FIG. 6, in which the strap clamp 118 is not bolted to the bracket 16, a gap 40 exists between the mounting flanges 134 and the bracket 16 because the diameter of the wear sleeve 22 surrounding the tube 12 is slightly greater than the depth of the U-shaped portion 124 when it is in an unloaded state. As seen in FIG. 6, the U-shaped portion 124 contacts the wear sleeve 22 (or the tube 12 in the event a wear sleeve is not used) at three points: one on both of the straight leg sections 126 and one at the midpoint of the semi-oval section 128. The portions of the strap clamp 118 between these points of contact are spaced from the outer surface of the wear sleeve 22 due to the elongated curvature of the semi-oval section 128. This configuration of the strap clamp 118 gives it sufficient flexibility to allow even unusually large clamp gaps to be closed when the strap clamp 118 is bolted to the bracket 16. Thus, as shown in FIG. 7, in which the strap clamp 118 is bolted to the bracket 16, the mounting flanges 134 are flush with the bracket 16.

The foregoing has described a strap clamp having sufficient strap flexibility to enable the clamping assembly to be properly closed. While specific embodiments of the present invention have been described, it will be apparent to those skilled in the art that various modifications thereto can be made without departing from the spirit and scope of the invention as defined in the appended claims.

What is claimed is:

1. A tube clamping assembly comprising:
   a bracket; and
   a strap clamp for clamping a tube having a diameter to said bracket, wherein said strap clamp has two mounting flanges extending therefrom on opposite sides thereof, wherein said strap clamp having a depth which is adapted to be less than said diameter of said tube when in an unloaded state and adapted to be sufficiently flexible so as to close large clamp gaps existing between said two mounting flanges and said bracket.

2. The clamping assembly of claim 1 wherein said strap clamp comprises a generally U-shaped portion having a pair of angled leg sections connected to a flat section.

3. The clamping assembly of claim 2 wherein each of said angled leg sections forms an obtuse angle at about its midpoint so as to define an inner segment connected to said flat section and an outer segment.

4. The clamping assembly of claim 3 wherein each inner segment of said angled leg sections forms an obtuse angle with said flat section.

5. The clamping assembly of claim 4 wherein said outer segments are substantially perpendicular to said flat section.

6. The clamping assembly of claim 2 wherein said mounting flanges extend from each one of said angled leg sections.

7. The clamping assembly of claim 6 further comprising a fastener extending through each mounting flange and engaging said bracket for fastening said strap clamp to said bracket.

8. The clamping assembly of claim 6 further comprising at least one support extending between each one of said mounting flanges and a corresponding one of said angled leg sections.

9. The clamping assembly of claim 1 wherein said strap clamp comprises a generally U-shaped portion having a pair of leg sections connected to a semi-oval section.

10. The clamping assembly of claim 9 wherein said semi-oval section defines a curve having a radius of curvature that is greater at its center than at its ends.

11. The clamping assembly of claim 9 wherein said mounting flanges extends from each one of said leg sections.

12. The clamping assembly of claim 11 further comprising a fastener extending through each mounting flange and engaging said bracket for fastening said strap clamp to said bracket.

13. The clamping assembly of claim 11 further comprising at least one support extending between each one of said mounting flanges and a corresponding one of said leg sections.

14. The clamping assembly of claim 1 further comprising a wear sleeve disposed between said strap clamp and said tube.

15. The clamping assembly of claim 1 further comprising a second strap clamp for clamping another tube to said bracket.

16. The clamping assembly of claim 1 wherein said strap clamp contacts said tube at three points and portions of said strap clamp between said points are not in contact with said tube.

17. The clamping assembly of claim 14 wherein said strap clamp contacts said wear sleeve at three points and portions of said strap clamp between said points are not in contact with said wear sleeve.

\* \* \* \* \*